United States Patent
Mathé et al.

(10) Patent No.: US 11,233,255 B2
(45) Date of Patent: Jan. 25, 2022

(54) STARTING BURNER FOR A FUEL CELL SYSTEM

(71) Applicants: AVL List GmbH, Graz (AT); Nissan Motor Co., Ltd., Yokohama (JP)

(72) Inventors: Jörg Mathé, Graz (AT); Michael Reissig, Graz (AT); Thomas Krauss, Graz (AT); Julian Makinson, Graz (AT); Bernd Reiter, Kainbach bei Graz (AT); Vincent Lawlor, Graz (AT); Tatsuya Yaguchi, Yokohama (JP); Tetsushi Noda, Yokohama (JP); Takeshi Shiomi, Yokosuka (JP)

(73) Assignees: AVL List GmbH, Graz (AT); Nissan Motor Co., Ltd., Yokohama (JP)

( * ) Notice: Subject to any disclaimer, the term of this patent is extended or adjusted under 35 U.S.C. 154(b) by 68 days.

(21) Appl. No.: 16/484,842

(22) PCT Filed: Feb. 8, 2018

(86) PCT No.: PCT/EP2018/053124
§ 371 (c)(1),
(2) Date: Aug. 9, 2019

(87) PCT Pub. No.: WO2018/146172
PCT Pub. Date: Aug. 16, 2018

(65) Prior Publication Data
US 2019/0379071 A1    Dec. 12, 2019

(30) Foreign Application Priority Data

Feb. 9, 2017   (AT) .............................. A 50108/2017
Feb. 9, 2017   (AT) .............................. A 50109/2017

(51) Int. Cl.
*H01M 8/04225*   (2016.01)
*H01M 8/04302*   (2016.01)
(Continued)

(52) U.S. Cl.
CPC ......... *H01M 8/04225* (2016.02); *C01B 3/323* (2013.01); *F23D 14/12* (2013.01);
(Continued)

(58) Field of Classification Search
CPC .......... H01M 8/04022; H01M 8/04225; F23D 14/18; F23D 14/12; F23C 2900/13001; F23R 3/40
See application file for complete search history.

(56) References Cited

U.S. PATENT DOCUMENTS 4,926,645 A * 5/1990 Iwai .......................... F23R 3/40
                                                               60/723
4,927,353 A * 5/1990 Nomura ................. F23C 13/00
                                                               431/215

(Continued)

FOREIGN PATENT DOCUMENTS

EP      0831055      3/1998
EP      0924786      6/1999
(Continued)

OTHER PUBLICATIONS

International Search Report and the Written Opinion dated Mar. 28, 2018 From the International Searching Authority Re. Application No. PCT/EP2018/053124. (14 Pages).
(Continued)

*Primary Examiner* — Matthew J Merkling

(57) ABSTRACT

The present invention concerns a starting burner (100a; 100b) for a fuel cell system (1000a; 1000b), having a catalyst (10) with a catalyst inlet (11) and a catalyst outlet (12), a catalyst area (13) being formed between the catalyst inlet (11) and the catalyst outlet (12), and the catalyst area (13) being surrounded by a catalyst wall (14) in a passage direction (D) from the catalyst inlet (11) to the catalyst outlet (12), and an operating fluid guide section (20) for supplying an operating fluid (F1) to the catalyst inlet (11), wherein the
(Continued)

operating fluid guide section (20) is arranged outside the catalyst (10) at least in sections along the catalyst wall (14). The invention also concerns a fuel cell system (1000) with the starting burner (100a; 100b) and a method for heating a service fluid (F1) in the fuel cell system (1000a; 1000b).

18 Claims, 4 Drawing Sheets

(51) Int. Cl.
    *C01B 3/32*         (2006.01)
    *F23D 14/12*       (2006.01)
    *H01M 8/04014*   (2016.01)
    *H01M 8/0432*     (2016.01)
    *H01M 8/04701*   (2016.01)
    *F23D 14/66*       (2006.01)
    *F23D 14/18*       (2006.01)
    *F23R 3/40*        (2006.01)

(52) U.S. Cl.
    CPC ............. *F23D 14/18* (2013.01); *F23D 14/66* (2013.01); *F23R 3/40* (2013.01); *H01M 8/04022* (2013.01); *H01M 8/04302* (2016.02); *H01M 8/04373* (2013.01); *H01M 8/04731* (2013.01); *F23C 2900/13001* (2013.01)

(56) References Cited

U.S. PATENT DOCUMENTS

| | | | | |
|---|---|---|---|---|
| 5,110,563 | A | | 5/1992 | Noakes et al. |
| 5,375,999 | A | * | 12/1994 | Aizawa .................. F23C 13/00 431/328 |
| 5,718,164 | A | * | 2/1998 | Finken ................... A23N 12/08 34/134 |
| 6,077,620 | A | * | 6/2000 | Pettit ......................... C01B 3/48 429/425 |
| 6,224,370 | B1 | * | 5/2001 | Tomizawa .............. F23C 13/00 431/326 |
| 6,232,005 | B1 | * | 5/2001 | Pettit ................... H01M 8/0612 429/424 |
| 6,306,531 | B1 | | 10/2001 | Clingerman et al. |
| 6,612,830 | B2 | * | 9/2003 | Berry ................ H01M 8/04231 431/7 |
| 6,712,603 | B2 | * | 3/2004 | Pettit ......................... F23G 7/07 431/7 |
| 10,717,648 | B2 | * | 7/2020 | Finnerty .................. B01J 19/24 |
| 2004/0224196 | A1 | * | 11/2004 | Pastula .............. H01M 8/0612 429/423 |
| 2013/0089799 | A1 | * | 4/2013 | Reuber ............... H01M 8/0618 429/423 |
| 2016/0006064 | A1 | * | 1/2016 | Reissig ............... H01M 8/0631 429/425 |

FOREIGN PATENT DOCUMENTS

| | | |
|---|---|---|
| EP | 1693916 | 8/2006 |
| EP | 2284938 | 2/2011 |
| JP | 2002147716 | 5/2002 |
| WO | WO 03/060380 | 7/2003 |
| WO | WO 2014/117952 | 8/2014 |
| WO | WO 2018/146172 | 8/2018 |

OTHER PUBLICATIONS

Search Report dated Dec. 19, 2017 From the Austrian Patent Office Re. Application No. A 50108/2017 and its English Summary (2 Pages).

Search Report dated Dec. 20, 2017 From the Austrian Patent Office Re. Application No. A 50109/2017 and its English Summary (2 Pages).

* cited by examiner

STARTING BURNER FOR A FUEL CELL SYSTEM

RELATED APPLICATIONS

This application is a National Phase of PCT Patent Application No. PCT/EP2018/053124 having International filing date of Feb. 8, 2018, which claims the benefit of priority of Austrian Patent Application Nos. A50108/2017 and A50109/2017, both filed on Feb. 9, 2017. The contents of the above applications are all incorporated by reference as if fully set forth herein in their entirety.

The present invention relates to a starting burner for a fuel cell system, in particular a SOFC system, a fuel cell system with a starting burner and a method for heating an operating fluid in a fuel cell system.

FIELD AND BACKGROUND OF THE INVENTION

In the state of the art different starting burners for different fuel cell systems are known. The DE 102 37 744 A1 is a fuel cell system with a starting burner which is installed in a burner housing. In the burner housing, bypass air can flow along the outside of the starting burner before it enters a mixing zone together with hot gas leaving the starting burner. In the mixing zone, the bypass air is mixed as homogeneously as possible with the hot gas in order to escape as a temperature-controlled hot gas flow and to heat the fuel cell system. A temperature control can be performed by appropriate dosing of the supplied bypass air and, if necessary, additionally by suitable dosing of the air and the fuel, for example hydrocarbon-containing fuel, which is supplied to the starting burner. By guiding the bypass air along the starting burner, the surroundings of the starting burner can be protected from the heat generated in the starting burner. Nevertheless, the starting burner is cooled by the bypass air guidance described above and the patent application in question does not provide any solution as to how this problem could be taken into account.

DE 100 55 613 A1 shows a starting burner in a fuel cell system, whereby the starting burner is configured in the form of a twin-tube burner. The two-pipe burner has two pipe sections arranged concentrically to each other, i.e. an inner and an outer pipe section. A fuel injector for injecting fuel into the inner pipe section is arranged upstream of the inner pipe section. Inside the inner pipe section there is a spark plug for igniting the fuel injected by the fuel injector into the inner pipe section. A catalyst reactor may be located downstream of the inner pipe section. Thermal insulation of the hot inner pipe section can be achieved by air flowing around the inner pipe section. However, even with this system it is problematic that the air supplied to the internal piping system for combustion is relatively cold. A separate preheating of the supplied air would entail corresponding additional costs and a loss of efficiency with regard to the operation of the starting burner or the fuel cell system.

SUMMARY OF THE INVENTION

The object of the present invention is to remedy at least in part the disadvantages described above. In particular, it is the object of this invention to provide an improved starting burner for preheating a fuel cell system.

The preceding object is solved by the claims. In particular, the foregoing object shall be solved by the starting burner according to claim 1, the fuel cell system according to claim 17 and the method according to claim 18. Further advantages of the invention result from the dependent claims, the description and the drawings. Features and details which are described in connection with the starting burner naturally also apply in connection with the inventive fuel cell system, the inventive process and vice versa, so that with regard to the disclosure of the individual aspects of the invention, reference is or can always be made to each other.

According to a first aspect of the present invention, a starting burner is provided for a fuel cell system, in particular for a SOFC system (SOFC stands for solid oxide fuel cell). The starting burner has a catalyst with a catalyst inlet and a catalyst outlet, whereby a catalyst area is formed between the catalyst inlet and the catalyst outlet and the catalyst area is surrounded by a catalyst wall in a passage direction from the catalyst inlet to the catalyst outlet. The starting burner further comprises an operating fluid guide section for supplying an operating fluid to the catalyst inlet. According to the invention, the operating fluid guide section is arranged outside the catalyst at least in sections along the catalyst wall.

The operating fluid guide section is thus configured to guide the operating fluid outside the catalyst along the catalyst wall in the direction of the catalyst inlet. This enables the direction of operating fluid, for example in the form of air, along the catalyst wall or along an outer wall section of the catalyst wall in the direction of the catalyst inlet. This can form an advantageous thermal insulation layer that protects the catalyst environment from the heat generated in the catalyst. In addition, the catalyst can heat the air guided along the catalyst wall. This heat is transported into the catalysts by the starting burner. This leads to efficient combustion in the catalyst. In the context of this invention, it has been surprisingly found that heating the operating fluid or air by the catalyst has no or hardly any negative effect on combustion in the catalyst. This means that the advantages resulting from the fact that the heated operating fluid is supplied to the catalyst clearly outweigh the possible disadvantages which could result from the fact that the catalyst is cooled by the passing operating fluid. Accordingly, the operating fluid guide section can fulfill the above-mentioned advantageous dual function in the starting burner according to the invention.

By preheating the operating fluid upstream of the catalyst in accordance with the invention, the catalyst can be operated with a particularly high degree of efficiency. The heat output that can be generated by the catalyst is correspondingly high.

By arranging the operating fluid guide section outside the catalyst along the catalyst wall or on the side of the catalyst, the starting burner can be made particularly compact. This is particularly advantageous for mobile applications of the starter burner, for example in the automotive sector.

The starting burner is understood to be in particular a starting burner for heating an afterburner of the fuel cell system, which in turn is provided for heating a reformer of the fuel cell system. During a cold start of the fuel cell system, when the afterburner is still cold and is therefore not suitable for heating a reformer of the fuel cell system, the afterburner can be preheated by the starting burner. As soon as the afterburner is at operating temperature due to the operation of the fuel cell system, the starting burner can be deactivated.

Due to the catalyst used in the starting burner, additional ignition means, for example in the form of a spark plug, can be dispensed with. This can save corresponding costs.

The catalyst wall does not have to be directly adjacent to the catalyst area. I.e., it is possible that at least a sectional space is formed between the catalyst area and the catalyst wall or an inner wall section of the catalyst wall.

The operating fluid guide section is preferably arranged along an outer wall section of the catalyst wall. In this case, the outer wall portion of the catalyst may be an inner wall portion of the service fluid guide section. Nevertheless, it is possible, according to the invention, that an outer wall section of the operating fluid guide section is arranged at the outer wall section of the catalyst wall or even at a slight distance from the catalyst wall. Depending on the application variant of the invented starting burner, its system configuration allows it to be used or operated simultaneously as an afterburner in a simple manner.

According to a further development of the present invention it is possible that the operating fluid guide section along the catalyst wall defines a direction for the operating fluid, whereby the guide direction runs at least in sections parallel or at an acute angle and opposite to the passage direction. This means that the operating fluid guide section is configured to guide the operating fluid along and/or beside the catalyst wall and in the direction of the catalyst inlet. This enables efficient warming up or preheating of the operating fluid in a compact configuration of the starting burner, especially if the direction of flow is parallel or essentially parallel to the direction of passage. The operating fluid guide section specifies the direction of the operating fluid, preferably along an outer wall section of the catalyst wall. The operating fluid guide section is preferably configured from at least one area at the catalyst outlet to an area at the catalyst inlet along the catalyst wall. This means that the operating fluid guide section is configured along the catalyst wall in such a way that operating fluid can be guided in the area of the catalyst outlet to the catalyst wall or an outer wall section of the catalyst wall and from there along or beside catalyst wall in the direction of the catalyst inlet. Accordingly, the operating fluid guide section for the operating fluid specifies a guide direction which runs outside the catalyst and along the catalyst wall in the opposite direction or at least essentially or partially opposite to the passage direction, in particular from the area at the catalyst outlet to the area at the catalyst inlet.

It may also be advantageous if, in the case of an invented starting burner, the catalyst wall is at least in sections in the form of a hollow cylinder and the operating fluid guide section is at least partially annular, at least in sections around the catalyst wall. Due to the annular configuration of the operating fluid guide section around the catalyst wall, as soon as the operating fluid is passed through the operating fluid guide section, heat generation in the catalyst can be effectively shielded from the environment of the catalyst. In addition, the annular configuration of the operating fluid guide section can provide a large contact area or area between the operating fluid guide section and the catalyst wall. This allows the operating fluid to be heated over a correspondingly large area when it is directed in the direction of the catalyst inlet. This enables effective pre-heating of the operating fluid. The catalyst and the operating fluid guide section are arranged concentrically or essentially concentrically to each other, so to speak, at least in sections. The ring shape is not limited to a circular ring shape. For example, the operating fluid guide section can also be elliptical or angularly annular around the catalyst wall or at least partly around the catalyst wall. The partly ring-shaped configuration can be understood as a U- or C-shaped configuration of the operating fluid guide section.

In addition, it is possible that, in the case of a starting burner, according to the invention, the operating fluid guide section is arranged at least in sections directly or essentially directly on the catalyst wall or the catalyst wall is configured as a separation wall between the operating fluid guide section and the catalyst area. This makes the starting burner particularly space saving. If the catalyst wall is configured as a separation between the operating fluid guide section and the catalyst area, a wall section in the operating fluid guide section may be omitted. This means that the starting burner can not only be made available in a compact form, but also with low weight and correspondingly low cost. In this case, the working fluid guide section may be provided as part of a housing body in which the catalyst is at least partially located. A direct arrangement of the operating fluid guide section on the catalyst wall in the present case can be understood to mean that the operating fluid guide section runs directly or essentially directly on or along the catalyst wall.

In the context of this invention, it is also possible that the operating fluid guide section of a starting burner has a flow cross-section for guiding the operating fluid, at least one fluid guide element being configured within the flow cross-section for defined flow influencing of the operating fluid in the operating fluid guide section. Through targeted flow control, it is possible to achieve a particularly homogeneous and turbulence-free or at least turbulence-reduced inflow of the operating fluid into the catalyst or catalyst inlet.

In the case of an invented starting burner, a further operating fluid, in particular a fuel, is injected into a mixing chamber upstream of the catalyst inlet. The operating fluid is also fed into the mixing chamber, in particular in the form of air or another fluid containing oxygen. The fluid guide elements allow a turbulence-free or at least turbulence-reduced inflow of the operating fluid into the mixing chamber, thus enabling an advantageous mixing of the operating fluid with the further operating fluid as well as a broad inflow of the catalyst inlet. The flow cross section is generally understood to be a free flow cross section, at least in sections. The area of the flow cross-section in the area of the at least one fluid guide element is thus reduced by the corresponding cross-section of the fluid guide element. The starting burner preferably has a base body which extends outside the catalyst at least in sections in the longitudinal direction of the catalyst wall, at a distance from it. The flow cross-section is preferably formed in an area between the catalyst wall, in particular an outer wall section of the catalyst wall, and an inner wall section of the base body. It is also possible that the flow cross-section is only formed within the base body. In this case, a wall section of the base body is arranged adjacent to the catalyst wall or to the outer wall section of the catalyst wall. The at least one fluid guiding element is preferably rib-shaped, in particular plate-shaped. This invention has shown that this form leads to a particularly advantageous influence on the flow of the operating fluid.

A further advantage may be if, in the case of a starting burner, the fluid guide element on the catalyst wall is configured, in particular as an integral part of the catalyst wall. i.e. the at least one fluid guide member is not provided as a separate component adjacent to the catalyst and the operating fluid guide section. This makes it particularly easy to assemble the starting burner and disassemble it in the event of a fault or repair. Since the at least one fluid guide element is an integral component of the catalyst wall, further mounting parts for fastening the at least one fluid guide element in the starting burner can be dispensed with. This can save corresponding costs. In addition, the reduction of components leads to a correspondingly low logistical effort. This also leads to corresponding cost savings.

In the context of the present invention, it is also possible that the at least one fluid guide element is configured as an integral part of a base body, by means of which the operating fluid guiding section is formed, in which the catalyst is at least partially arranged and/or which surrounds the catalyst at least in sections in an annular manner. By the fact that the at least one fluid guide element is configured as an integral component of the catalyst wall, it can be understood that the fluid guide element is a monolithic component of the catalyst or of the catalyst wall, respectively. The at least one fluid guiding element can be produced together with the catalyst wall as a monolithic casting. Alternatively, the at least one fluid guide element can be connected to the catalyst wall in a materially bonding manner. For example, at least one fluid guide element can be attached to the catalyst wall via a weld or adhesive seam.

In addition, it is possible that in a starting burner, according to the invention, a perforated separation area is arranged in an operating fluid flow direction between an end portion of the operating fluid guide section and the catalyst inlet, through which the operating fluid can be transferred from the operating fluid guide section in the direction of the catalyst.

The separating area enables a particularly homogeneous, turbulence-free or essentially turbulence-free inflow of the operating fluid in the direction of the catalyst inlet. A mixing chamber for mixing the operating fluid with a further operating fluid is preferably arranged between the perforated separating area and the catalyst inlet, wherein the operating fluid can be transferred into the mixing chamber via or through the perforated separating area. Accordingly, the perforated separation area enables a particularly homogeneous, turbulence-free or essentially turbulence-free flow of the operating fluid into the mixing chamber. This allows a good mixing between the operating fluid, e.g. air, and the other operating fluid, e.g. a fuel, to be achieved. In addition, a broad inflow of the catalyst inlet or an inlet area at the catalyst can be enabled.

According to further embodiments of the present invention, it is possible that the perforated separating section of a starting burner is funnel-shaped or essentially funnel-shaped. Due to the funnel shape, the operating fluid, which is transferred through the operating fluid guide section preferably around the catalyst at the catalyst wall along the direction of the catalyst inlet, can be transferred through the separation section in the direction of the catalyst inlet over a relatively large area and avoiding unwanted turbulence. A mixing chamber for mixing the operating fluid, e.g. air, with a further operating fluid, e.g. fuel, is preferably provided at least in sections within the funnel-shaped separating section. In this case, the larger opening of the funnel-shaped separating section is configured in the direction of the catalyst inlet. The small orifice is configured in the direction of an injector, which is arranged to inject further operating fluid into the mixing chamber. In this case, the funnel-shaped separating section is preferably configured to correspond to an injection funnel of the additional operating fluid in the direction of the catalyst inlet, or slightly larger than this. This means that the available installation space in the starting burner can be used particularly efficiently. The funnel-shaped separating section is preferably arranged coaxially to the catalyst or essentially coaxially to the catalyst and axially upstream to the catalyst.

Furthermore, it is possible that, in the case of a starting burner, according to the invention, the perforated separating section adjoins an end section of the catalyst wall, the catalyst wall in an area of the catalyst inlet having a larger cross-section than the catalyst area, and the catalyst wall extending from this area in the passage direction at least over part of the catalyst area at a distance from the catalyst area. This enables the operating fluid or a mixture of operating fluids to penetrate not only into an end face of the catalyst or catalyst inlet, respectively, but also into a lateral portion of the catalyst area which is orthogonal or essentially orthogonal to the end face of the catalyst. This means that a large inlet area can be created for the operating fluid or a mixture of operating fluids, making the catalyst particularly effective to operate.

Furthermore, it may be advantageous in the context of the present invention if the operating fluid conducting section is configured at least in sections as a component of a housing body of the starting burner, the separating section being configured as a component, in particular as an integral and/or monolithic component of the housing body. Since the operating fluid guide section and the separating section are configured as integral or monolithic components of the housing body, the starting burner can be made available in a particularly compact and reliable manner. Few single parts lead to a simple assembly or disassembly of the starting burner, a low logistic expenditure as well as correspondingly low costs with the production and maintenance of the starting burner.

Furthermore, in the case of an starting burner, it is possible for at least one injector which is configured for injecting a further operating fluid into a mixing chamber of the starting burner upstream of the catalyst inlet to be arranged, the mixing chamber being arranged and configured for mixing the operating fluid with the further operating fluid. The injector can be configured as any nozzle. The arrangement of the mixing chamber upstream of the catalyst allows a working fluid mixture to be produced which is pre-heated by the heated working fluid before entering the catalyst. This means that the catalyst can be operated at a particularly high output. The operating fluid is preferably air, in particular from a compressor or ambient air. The other operating fluid is preferably a fuel, in particular a hydrocarbon-containing fluid such as methane or ethanol. Nevertheless, it is possible within the scope of the present invention that the operating fluid is the fuel and the other operating fluid is air.

In the case of a starting burner, according to the invention it may be advantageous if the mixing chamber has a deflecting section configured to deflect a flow direction of the operating fluid from the direction of flow to the passage direction. The deflection section allows the operating fluid to be deflected from the direction of flow to the passage direction in a range between 150° and 210°, preferably 180° or essentially 180°.

The operating fluid can be directed advantageously in the direction of the catalyst inlet through the deflection section. The deflection section preferably has a curve section or a spherical section through which the operating fluid can be deflected in the direction of the catalyst inlet with as little friction as possible. In the context of the present invention, the deflection section may be at least partially formed at an end section of the operating fluid guide section and thus before and/or after the perforated separation section. This means that the operating fluid can be directed advantageously into the perforated separating section.

It is also possible, in the case of a starting burner in accordance with the invention and upstream of the catalyst inlet, in particular upstream of the catalyst inlet and downstream of the mixing chamber, that a heating means, in particular an electrical heating means, is arranged for heating an operating fluid mixture from the operating fluid and the further operating fluid. The heating medium allows further preheating of the operating fluid or the operating fluid mixture. This allows the catalyst to be operated particularly effectively and with a correspondingly high output. The heating medium is preferably plate-shaped and is located on one of the two large side surfaces on the catalyst inlet. This means that the heating medium is arranged in the starting burner in a particularly space-saving manner. Furthermore, the heating medium itself may have a catalyst function, for example by a catalyst coating of the heating medium or by the heating medium having catalyst material, or by the heating medium being formed of catalyst material or essentially of catalyst material. By catalyst material is meant in particular material for conveying and/or starting catalyst combustion and/or temperature control in and/or on the heating medium. When using a water-rich fuel such as an ethanol-water mixture, the heating medium for the desired heating operation is preferably dimensioned so large that the heating power to be achieved can be achieved despite condensation of water on the heating medium. If low-water fuels such as pure ethanol or diesel are used, the heating medium may be correspondingly small. Preferably the heating medium has the same or essentially the same cross-section as an end face of the catalyst inlet. This means that the heating medium extends, preferably in the form of a plate, in particular over the entire end face of the catalyst or catalyst inlet. In other words, one of the two side faces is preferably congruent or essentially congruent with the front face of the catalyst. This means that the operating fluid or the mixture of operating fluids can be preheated over as large an area as possible to save space. The injector described above is preferably positioned in the middle of the projection or essentially in the middle of the heating medium. This allows the additional operating fluid to be applied as uniformly as possible to the heating medium, allowing the additional operating fluid or the operating fluid mixture to be heated efficiently. This in turn leads to efficient combustion in the catalyst. Since fuel, for example in the form of additional operating fluid, is or can be introduced directly into the mixing chamber upstream of the catalyst by the injector, it is possible to quickly stop the fuel supply and a corresponding heat supply by the starting burner by switching off the fuel supply.

Furthermore, in the case of a starting burner according to the invention at hand, the heating medium may be plate-shaped or essentially plate-shaped. This allows the heating medium to be arranged on the catalyst in a particularly space-saving manner. The plate-shaped heating medium is preferably positioned with one of its two large side surfaces at the catalyst inlet. Preferably the heating medium has the same or essentially the same cross-section as an end face of the catalyst inlet. This means that the heating medium preferably extends at least over the entire end face or essentially over the entire end face of the catalyst or catalyst inlet. In other words, one of the two large side faces of the heating medium is preferably congruent or essentially congruent with the end face of the catalyst. This means that the operating fluid or the mixture of operating fluids can be preheated over as large an area as possible while still saving space.

In the case of a starting burner, according to the invention, it is also possible that only an upper side of the plate-shaped heating medium, in particular an upper side of the plate-shaped heating medium facing away from the catalyst inlet, can be directly heated. Tests performed within the scope of this invention have shown that the operating fluid mixture can be preheated sufficiently if it hits a heated surface of a plate-shaped heating medium or is passed through it into the catalyst. In addition, it has been shown that the heating of one surface during the start-up process of the fuel cell system also heats up the remaining heating medium sufficiently. Since only one surface or a single surface area of the plate-shaped heating medium can be directly heated, only this surface area can be directly heated, for example directly energized, when the operating fluid mixture is preheated. Compared to a case in which the entire heating medium is heated directly, the starting burner can be operated more energy-efficiently and correspondingly more efficiently and cost-effectively. In addition, energy-saving operation is particularly advantageous for mobile applications of the starting burner, for example in the automotive sector.

A further advantage can be achieved if the heating medium of a starting burner has an activation unit which can be used to activate and deactivate heating operation of the heating medium. This enables sequential operation or start-up of the starting burner. The heating medium can initially be activated for heating or preheating the operating fluid mixture until a defined operating temperature has been reached in the starting burner or catalyst. As soon as the defined operating temperature is reached, the heating medium can be deactivated. This means that the starting burner can be operated in a particularly energy-efficient manner with the above-mentioned advantages, thus increasing the efficiency of the entire fuel cell system.

According to another aspect of the present invention, a fuel cell system is provided with a starting burner as described in detail above. The fuel cell system further comprises an afterburner and a reformer, the afterburner being arranged and configured for heating the reformer and the starting burner for heating the afterburner. Thus, a fuel cell system according to the invention has the same advantages as those described in detail with regard to the starting burner according to the invention. The fuel cell system is preferably a SOFC system. The reformer is preferably configured to reform a fuel mixture, for example ethanol and water, into another fuel mixture, in this case hydrogen and carbon dioxide. The reformed hydrogen can be used in a fuel cell stack to generate electricity. The afterburner is configured to heat the reformer by means of anode exhaust gas from the fuel cell stack. In the case of an advantageous further training of the present invention, it is possible that an operating fluid supply section through which, for example, air is supplied to the operating fluid guide section, is arranged at least in sections along an outer wall section of the operating fluid supply section. This enables a space-saving manner to preheat the supplied operating fluid already in the operating fluid guide section. In addition, a further thermal insulation section for the thermal shielding of the starting burner can be created. To heat the reformer, the afterburner is preferably arranged around the reformer in a ring, at least in sections.

Another aspect of the present invention concerns a process for heating an operating fluid in a fuel cell system as described above. In accordance with the invention, the operating fluid is directed through the operating fluid guide section outside the catalyst at least in sections along the catalyst wall, in particular over the entire length of the catalyst wall, in the direction of the catalyst inlet. Thus, a process in accordance with the invention also has the same advantages as those described in detail above with regard to the starting burner and the fuel cell system in accordance with the invention. Furthermore, it is possible, in a method in accordance with the invention, for the operating fluid to be passed through the operating fluid guide section outside the catalyst at least in sections along the catalyst wall in the opposite direction to the passage direction to a heating medium which is upstream of the catalyst inlet, in particular directly or essentially directly at the catalyst inlet, and then through the heating medium into the catalysis area. Here a sequential operation or start-up of the starting burner is possible. Thus, the heating medium can initially be activated for heating or preheating the operating fluid or the operating fluid mixture until a defined operating temperature has been reached in the starting burner or catalyst. As soon as the defined operating temperature is reached, the heating medium can be deactivated.

In the scope of the present invention, it is also possible that the operating fluid mixture is transferred from the mixing chamber to the heating medium and from there to the catalyst. Furthermore, it is possible for the heating means to be in communication connection with a temperature sensor for determining a temperature in the fuel cell system, in particular in an afterburner of the fuel cell system, a heating operation of the heating means being activated or deactivated as a function of a defined temperature which is determined by the temperature sensor in the fuel cell system or in the afterburner. Accordingly, the heating medium is only activated when it is required. This means that the starting burner can be operated in a particularly energy-efficient manner.

Further measures to improve the invention result from the following description of various embodiments of the invention, which are shown schematically in the figures. All features and/or advantages resulting from the claims, the description or the drawing, including constructive details and spatial arrangements, may be essential to the invention both for themselves and in the various combinations.

They show schematically in each case:

DESCRIPTION OF SPECIFIC EMBODIMENTS OF THE INVENTION

Elements with the same function and mode of action have the same reference signs in FIGS. 1 to 6.

Figure 1:
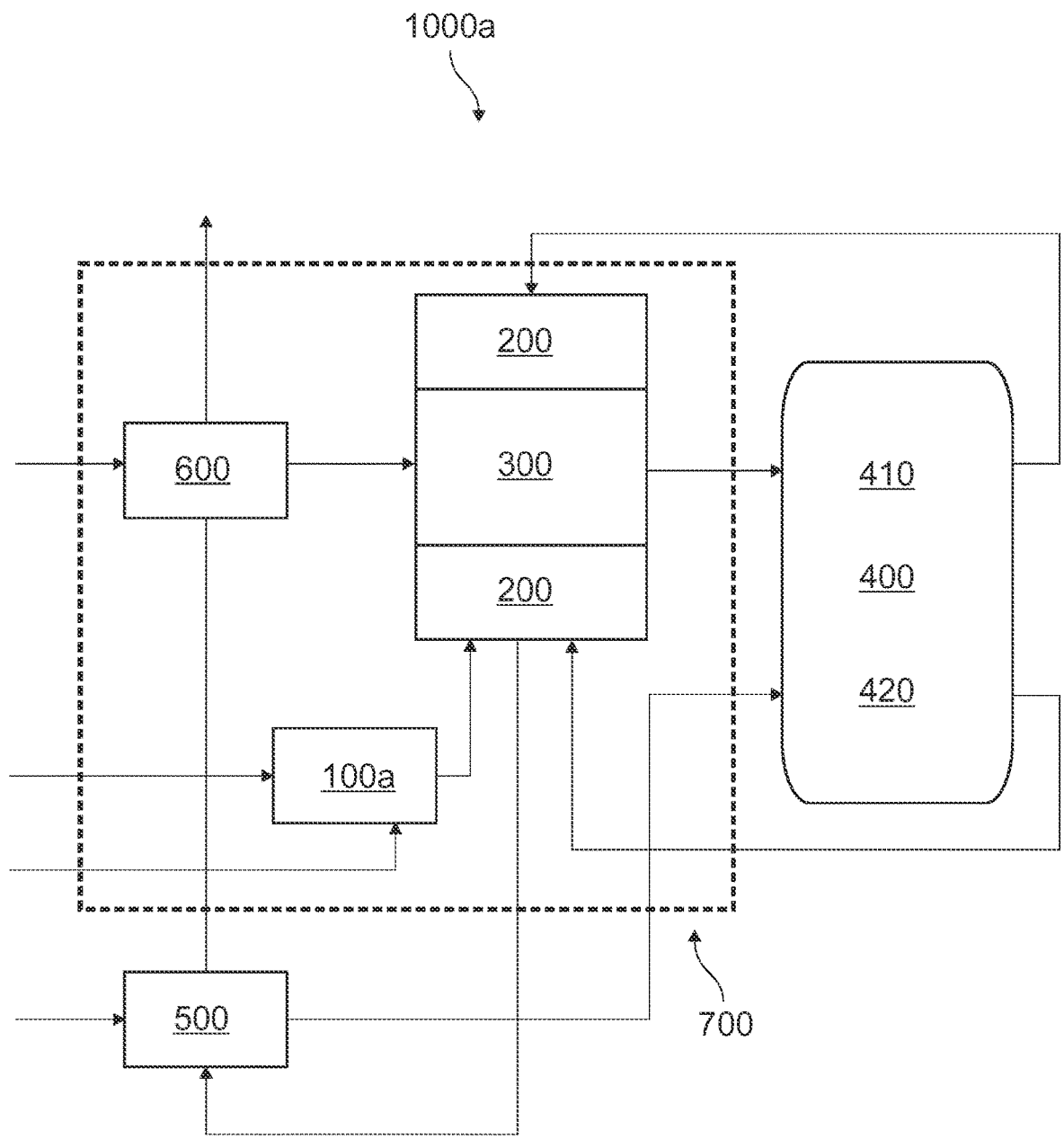
FIG. 1 a block diagram for representing a fuel cell system according to an embodiment according to the invention, FIG. 2 a starting burner in accordance with an initial embodiment of the present invention, FIG. 3 a starting burner in accordance with a second embodiment of the present invention, FIG. 4 a catalyst with fluid guiding elements and a heating medium according to an embodiment according to the invention, FIG. 5 a summary with a starting burner according to the first embodiment, a reformer and an afterburner to explain a possible function of the starting burner, and FIG. 6 a block diagram to represent a fuel cell system according to an alternative embodiment according to the invention.

FIG. 1 shows a block diagram of a 1000a fuel cell system with a 100a starting burner. The 1000a fuel cell system also has an afterburner 200 and a reformer 300. The afterburner 200 is arranged in a ring around the Reformer 300 to heat the Reformer 300. The starting burner 100a is arranged and configured for heating the afterburner 200 and thus for indirect heating of the reformer 300. Accordingly, the starting burner 100a is located upstream of the afterburner 200.

In FIG. 1 the starting burner 100a and the afterburner 200 are shown separately from each other. Within the scope of the present invention it is also possible that the starting burner 100a is configured as an integral unit the afterburner 200. This means that the fuel cell system 1000a can be made even more compact. The fuel cell system 1000a according to FIG. 1 is configured as a SOFC system.

Downstream of the reformer 300 there is a fuel cell stack 400 with an anode area 410 and a cathode area 420. A fuel mixture produced by the reformer 300 is fed to the anode area 410. Anode exhaust gas is fed into the afterburner 200, where the Reformer 300 can be heated by burning the anode exhaust gas. For combustion in the afterburner 200, it has an afterburner catalyst 230 (see e.g. FIG. 5) in the form of an oxidation catalyst. The burnt anode exhaust gas is led from the reformer 300 to a heat exchanger 500. From there, the exhaust gas is fed via an evaporator 600 into the vicinity of the fuel cell system 1000a. The heat exchanger 500 supplies 420 heated air to the cathode area. Cathode exhaust gas is also fed to the afterburner 200.

The starting burner 100a, the afterburner 200, the reformer 300 and the evaporator 600 are located in the fuel cell system 1000a in a so-called hotbox 700, in which a compact heat transfer between the respective components can be made possible. The related functions of starting burner 100a, after burner 200 and reformer 300 are described in detail later with reference to FIG. 5.

Figure 2:
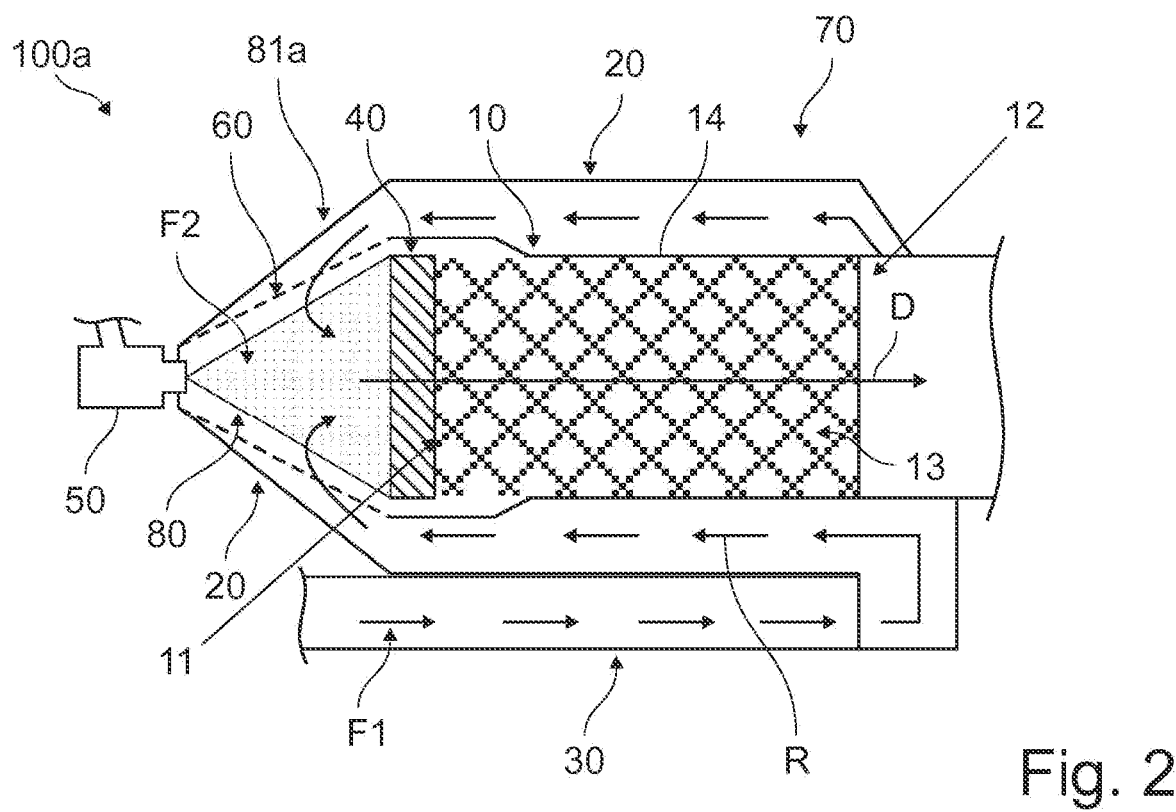

FIG. 2 shows a starting burner 100a for the fuel cell system 1000a shown in FIG. 1 in detail. The starting burner 100a has a catalyst 10 with a catalyst inlet 11 and a catalyst outlet 12, whereby a catalyst area 13 is configured between the catalyst inlet 11 and the catalyst outlet 12. The catalyst area 13 is surrounded by a catalyst wall 14 in a passage direction D from catalyst inlet 11 to catalyst outlet 12.

The starting burner 100a further has an operating fluid guide section 20 for supplying an operating fluid F1, as shown in FIG. 2, in the form of air, to the catalyst inlet 11. The operating fluid guide section 20 is arranged outside the catalyst 10 along the catalyst wall 14. To be more precise, the operating fluid guide section 20 is arranged and configured along the catalyst wall 14 from an area at catalyst outlet 12 to an area at catalyst inlet 11.

The operating fluid guide section 20 defines a guide direction R for the operating fluid along the catalyst wall 14, where the guide direction R is parallel and opposite to the passage direction D. The operating fluid guide section 20 defines a direction R for the operating fluid along the catalyst wall 14. The catalyst wall 14 is in the form of a hollow cylinder, more precisely in the form of a stepped wooden cylinder. The operating fluid guide section 20 is configured as a ring around the catalyst wall 14.

In accordance with the embodiment shown in FIG. 2, the operating fluid guide section 20 is arranged in sections directly on the catalyst wall 14. To be more precise, the catalyst wall 14 in the embodiment shown here is configured as a separation wall between the operating fluid guide section 20 and the catalyst area 13. FIG. 2 can in principle also be understood to mean that an outer wall section of the catalyst wall 14 forms part of the operating fluid guide section 20.

As further shown in FIG. 2, in a working fluid flow direction between an end portion of the working fluid guide section 20 and the catalyst inlet 11, a perforated separation section 60 is arranged through which the working fluid F1 can be transferred from the working fluid guide section 20 in the direction of the catalyst 10. The perforated separating section 60 is funnel-shaped. Perforated here means that the separation section 60 is configured with recesses, which are, for example, regularly made in the form of holes or slots or of other types, also in different combinations of different variants.

In addition, as shown in FIG. 2, the perforated separation portion 60 is adjacent to an end face of the catalyst wall 14, wherein the catalyst wall 14 in an area of the catalyst inlet 11 has a larger cross-section or cross-section diameter than the catalyst area 13, and the catalyst wall 14 extends from said area in the passage direction D over a part of the catalyst area 13 spaced from the catalyst area 13. Between an inner wall section of the catalyst wall 14 and the catalyst area 13 there is therefore a free space. The operating fluid guide section 20 and the perforated separation section 60 are configured as a monolithic component of a housing body 70 of the starting burner 100a.

The starting burner 100a shown has an injection element or an injector 50 for injecting a further operating fluid F2, ethanol, into a mixing chamber 80 of the starting burner 100a upstream of the catalyst inlet 11. In the mixing chamber 80, the operating fluid F1 can be mixed with the other operating fluid F2. The perforated separating section 60, which surrounds or essentially surrounds the mixing chamber 80, is configured in the form of an injection funnel of the further operating fluid F2 or slightly larger than this. The funnel-shaped separating section 60 is coaxial with the injector 50 or an injection nozzle of the injector 50.

The mixing chamber 80 has a deflecting section 81a for deflecting a flow direction of the operating fluid F1 from the guide direction R to the guide direction D. The mixing chamber 80 has a deflecting section 81a for deflecting a flow direction of the operating fluid F1 from the guide direction R to the guide direction D. The mixing chamber 80 has a deflecting section 81a for deflecting a flow direction of the operating fluid F1 from the guide direction R to the guide direction D. The deflection section 81a partly overlaps with the mixing chamber 80 according to FIG. 2.

The starting burner 100a according to FIG. 2 has a heating medium 40 in the form of a plate-shaped electrical heating medium 40 upstream of the catalyst inlet 11 and downstream of the mixing chamber 80 for heating a working fluid mixture from the working fluid F1 and the further working fluid F2. In the embodiment shown, the heating medium 40 has a round cross-section just like the catalyst 10 and is arranged directly at the catalyst inlet 11. The heating medium 40 can be activated to heat the fluid mixture. In the event that preheating of the fluid mixture is no longer required, heating medium 40 can be deactivated.

The operating fluid F1 is supplied according to FIG. 2 by an operating fluid guide section 30, which is arranged and configured outside the operating fluid guide section 20 along an outer wall surface of the operating fluid guide section 20.

Figure 3:
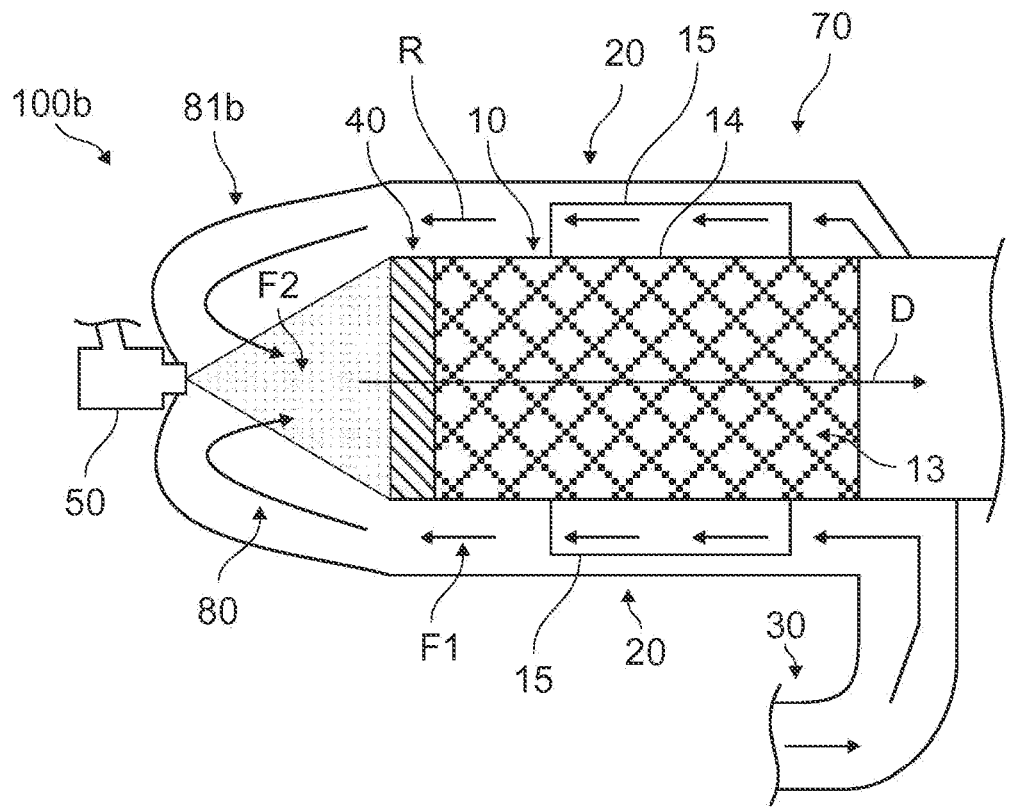

FIG. 3 shows a starting burner 100b according to a second embodiment. The second embodiment essentially corresponds to the first embodiment. In order to avoid repetitions, only distinguishing features between the first and second embodiment are described below.

Initially, the perforated separating section 60 was dispensed with in accordance with the second embodiment. This prevents a pressure loss that could be caused by the separation section 60 in the starting burner 100b or in the fuel cell system 1000a. The deflection section 81b of this embodiment has a curve section or a spherical section through which the operating fluid F1 can be deflected in the direction of the catalyst inlet 11 with particularly low friction and the starting burner 100b can be operated effectively accordingly. The operating fluid guide section 30 is configured at a distance from the operating fluid guide section 20. FIG. 3 also shows that within a free flow cross-section of the operating fluid guide section 20, two fluid guide elements 15 are configured to influence the flow of the operating fluid F1 in a defined manner.

FIGS. 1 to 3 illustrate a process for heating an F1 operating fluid in a fuel cell system 100a. In the process, working fluid F1 is passed through the working fluid guide section 20 outside the catalyst 10 section by section along the catalyst wall 14 along the entire length of the catalyst wall 14 in the direction of the catalyst inlet 11. Specifically, the operating fluid F1 in the operating fluid guide section 20 is transferred from an area at catalyst outlet 12 to an area at catalyst inlet 11 along the guide direction R, and thus parallel and opposite to the passage direction D, along the catalyst wall 14 and in the direction of catalyst inlet 11. In the process, the operating fluid mixture is also passed from the mixing chamber 80 to the heating medium 40 and from there to the catalyst 10. Specifically, the first operating fluid F1 is passed through the operating fluid guide section 20 outside the catalyst 10 along the catalyst wall 14 along the entire length of the catalyst wall 14 towards the catalyst inlet 11.

Figure 4:
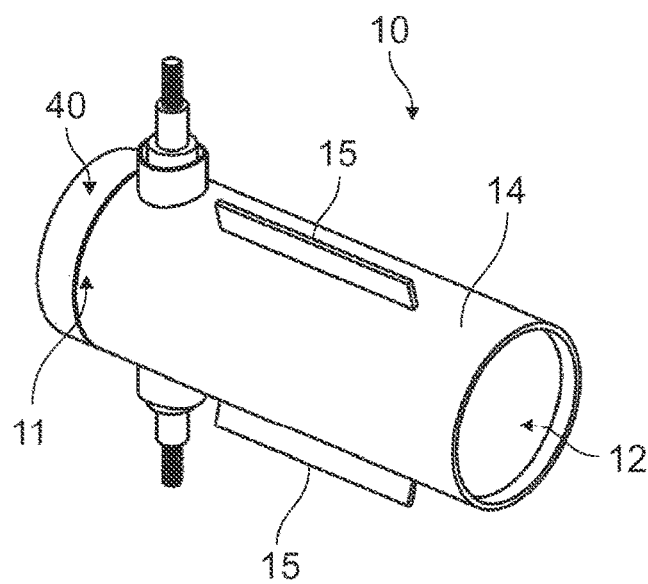

FIG. 4 shows a catalyst 10 with a catalyst inlet 11, a catalyst outlet 12 and a catalyst wall 14. FIG. 4 also shows a heating medium 40 arranged directly at the catalyst inlet 11. As can also be seen in FIG. 4, plate-shaped, linear fluid guide elements 15 on the catalyst wall 14 are configured for the defined flow influence of an operating fluid F1. The fluid guide elements 15 are connected to the catalyst wall 14 in a material-locking manner and protrude radially from it. The fluid guide elements 15 extend in their longitudinal direction parallel to the passage direction D. If such a catalyst 10 is used in a starting burner 100a or 100b as shown in FIG. 2 or FIG. 3, the fluid guide elements 15 are configured within a flow cross-section or a free flow cross-section of the operating fluid guide section 20.

Figure 5:
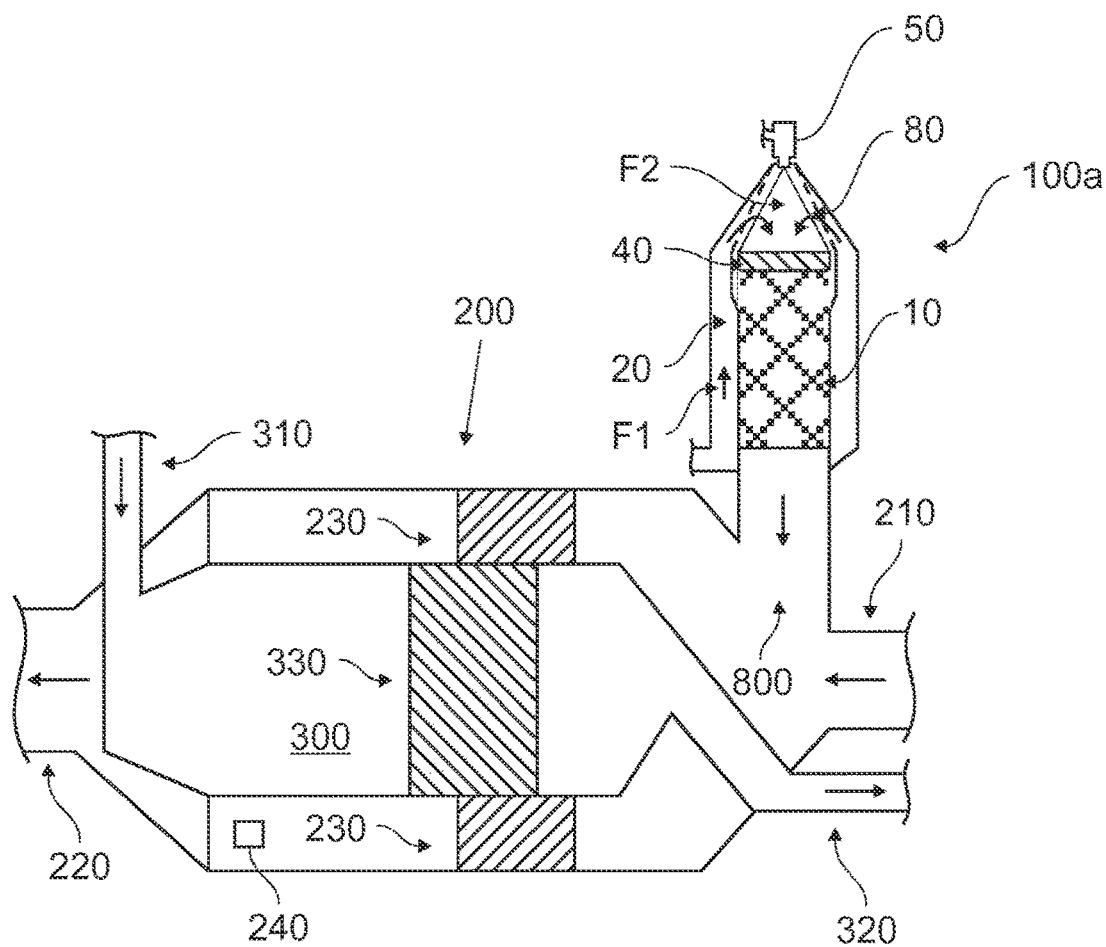

FIG. 5 shows an overview with a starting burner 100a arranged upstream of an afterburner 200, wherein the afterburner 200 is arranged annularly around a reformer 300. The afterburner 200 has an afterburner inlet 210 and an afterburner outlet 220. In addition, the afterburner 200 has an afterburner catalyst 230, which in the present case is ring-shaped. The reformer 300 has a reformer inlet 310 and a reformer outlet 320. The reformer 300 also has a reformer catalyst 330.

When the fuel cell system 1000a is started, operating fluid F1 in the form of air is fed into the mixing chamber 80 via the operating fluid guide section 20. In addition, another operating fluid F2 in the form of a fuel is injected into the mixing chamber 80 through the injector 50. The operating fluid mixture is heated by the heating medium 40 and transferred to the catalyst 10 preheated accordingly. There, the operating fluid mixture is at least partially incinerated. Combusted fluid is fed from the catalyst 10 or the starting burner 100a into the afterburner 200. There it can warm up the reformer 300.

A fuel mixture from evaporator 600 is fed to reformer 300 via reformer inlet 310. Using the reformer catalyst 330, the fuel mixture can be converted into a suitable anode feed gas, such as hydrogen and carbon dioxide, as described above. The anode supply gas is supplied to anode area 410 of fuel cell stack 400 via reformer outlet 320. After a chemical reaction in the fuel cell stack 400, anode exhaust gas and cathode exhaust gas are fed to the afterburner 200 via the afterburner inlet 210, which is burnt in the afterburner 200 by means of the afterburner catalyst 230. This combustion can also heat the reformer 300. As shown in FIG. 5, the heated fluids or exhaust gases of the fuel cell stack 400 are fed together with the burned fluid from the starting burner 100a into the afterburner 200. For this purpose, a suitable fluid connection section 800 is configured between the starting burner 100a and the afterburner 200. As soon as the Reformer 300 has reached a defined operating temperature, the starting burner 100a can be deactivated, i.e. in this case no fuel and no air will be introduced into the starting burner 100a.

The heating medium 40 is in communication connection with a temperature sensor 240, which is arranged in the afterburner 200. Heating operation of the heating medium 40 can therefore be activated or deactivated depending on a defined temperature determined by the temperature sensor 240.

Figure 6:
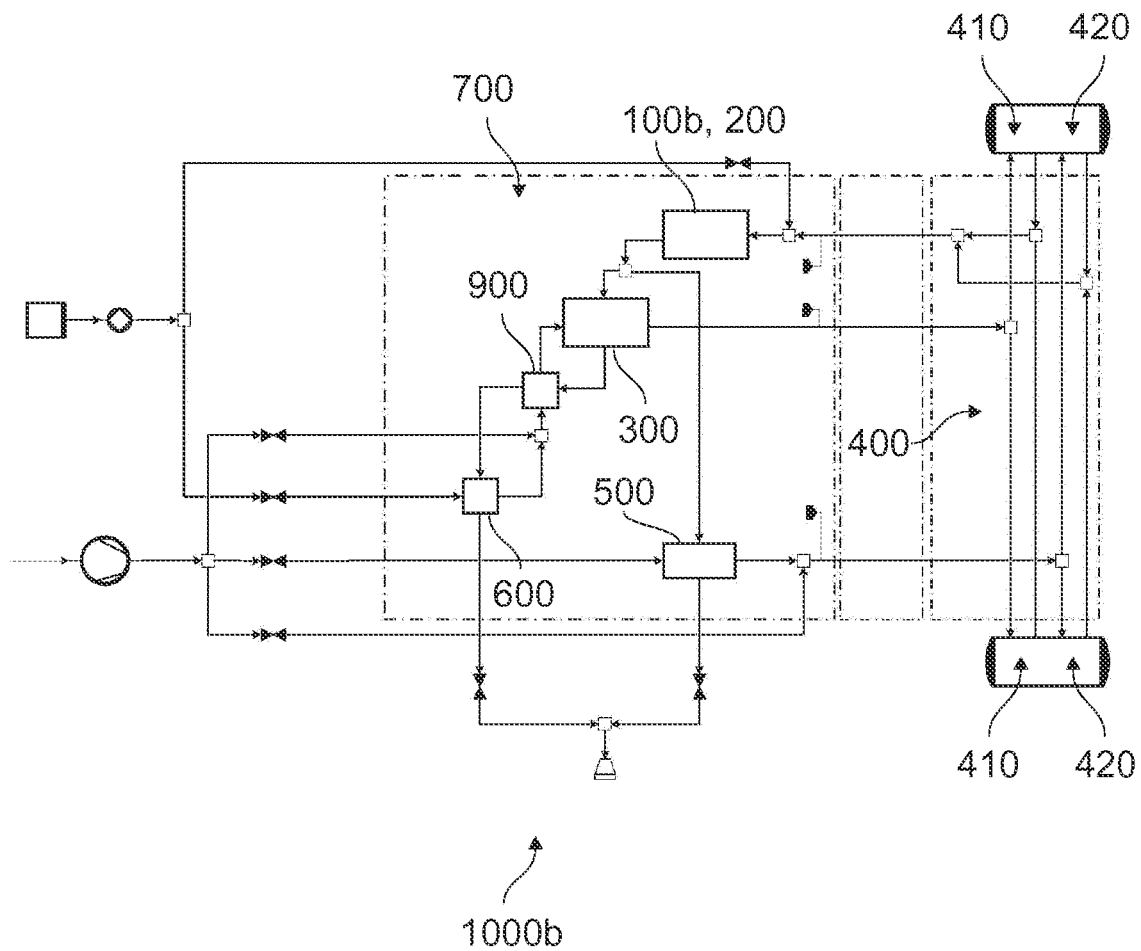

FIG. 6 shows a fuel cell system 1000b according to another embodiment. As can be seen in FIG. 6, the starting burner 100b is used simultaneously as afterburner 200. To be more precise, the starting burner 100b and the afterburner 200 are configured as a common, integral component in the form of a burner. Depending on an operating condition of the fuel cell system 1000b, the burner is used as a starting burner 100b or afterburner 200. According to FIG. 6, the starter burner 100b is configured to catalyst burn liquid fuel in particular, for which the starter burner 100b comprises a catalyst material. The 100b starting burner is operated as described above. Basically, the burner is configured according to the invention of the starting burner 100a. If the burner assumes the function of an afterburner 200, it is supplied with anode exhaust gas or fuel cell exhaust gas (anode exhaust gas and cathode exhaust gas) in a second operating fluid guide section in order to burn it completely. Since cathode exhaust gas, in particular, is exclusively air, the anode exhaust gas is burnt with the cathode exhaust gas in the starting burner 100b, which operates as an afterburner 200.

The 1000b fuel cell system shown in FIG. 6 also has at least one heat exchanger 900 and one evaporator 600 for heating and evaporating fuel for the reformer 300. Another heat exchanger 500 is arranged in a cathode feed section. Air is supplied to the cathode section 420 via a cold side of this heat exchanger 500. The air is heated via the completely burnt fuel cell stack exhaust gas in the afterburner 200. Downstream of the starting burner 100b or afterburner 200, the fuel cell stack exhaust gas stream is separated, part of which is released into the environment via the heat exchanger 500. The second part is also discharged into the environment via a warm side of the reformer 300, the heat exchanger 900 and the evaporator 600.

REFERENCES

10 Catalyst
11 Catalyst inlet
12 Catalyst outlet
13 Catalysis area
14 Catalyst wall
15 Fluid guide element
20 Operating fluid guide section
30 Operating fluid guide section
40 Heating means
50 Injector
60 Perforated separating area
70 Enclosure body
80 Mixing chamber
81a Deflection area
81b Deflection area
100a Starting burner
100b Starting burner
200 Afterburner
210 Afterburner inlet
220 Afterburner outlet
230 Afterburner catalyst
240 Temperature sensor
300 Reformer
310 Reformer input
320 Reformer output
330 Reformer catalyst
400 Fuel cell stacks
410 Anode area
420 Cathode area
500 Heat exchanger
600 Evaporator
700 Hot box
800 Fluid connection section
900 Heat exchanger
1000a Fuel cell system
1000b Fuel cell system
D Passage direction
F1 Operating fluid
F2 Further operating fluid
R guide direction

What is claimed is:

1. A starting burner for a fuel cell system, comprising:
a catalyst having a catalyst inlet and a catalyst outlet, a catalyst area being formed between the catalyst inlet and the catalyst outlet, and the catalyst area being surrounded by a catalyst wall in a passage direction from the catalyst inlet to the catalyst outlet,
an operating fluid guide section for supplying an operating fluid to the catalyst inlet,
wherein the operating fluid guide section is arranged outside the catalyst at least in sections along the catalyst wall, a deflection section formed at an end section of the operating fluid guide section directing the operating fluid into a perforated separating section, through which the operating fluid can be transferred from the operating fluid guide section in the direction of the catalyst, the perforated separation section being arranged in an operating fluid flow direction between an end section of the operating fluid guide section and the catalyst inlet and adjoining an end section of the catalyst wall,
wherein the perforated separating section is funnel-shaped and is configured with recesses regularly made in the form of holes or slots or of other types.

2. The starting burner according to claim 1, wherein the operating fluid guide section specifies a guide direction for the operating fluid along the catalyst wall, the guide direction running at least in sections parallel or at an acute angle and opposite to the passage direction.

3. The starting burner according to claim 1, wherein the catalyst wall is configured at least in sections in the form of a hollow cylinder and the operating fluid guide section is configured at least in part annularly, at least in sections around the catalyst wall.

4. The starting burner according to claim 1, wherein the operating fluid guide section is arranged at least in sections directly or substantially directly on the catalyst wall, or the catalyst wall is configured as a separation wall between the operating fluid guide section and the catalyst area.

5. The starting burner according to claim 1, wherein the operating fluid guide section has a flow cross-section for guiding the operating fluid, at least one fluid guide element being configured within the flow cross-section for defined flow influencing of the operating fluid in the operating fluid guide section.

6. The starting burner according to claim 1, wherein at least one fluid guide element is configured on the catalyst wall.

7. The starting burner according to claim 1, wherein the perforated separating section adjoins an end section of the catalyst wall, the catalyst wall having a larger cross-section than the catalyst area in an area of the catalyst inlet, and the catalyst wall extending from this area in the passage direction at least over part of the catalyst area at a distance from the catalyst area.

8. The starting burner according to claim 1, wherein the operating fluid guide section is configured at least in sections as a component of a housing body of the starting burner, the perforated separating area being configured as a component of the housing body.

9. The starting burner according to claim 1, wherein at least one injector for injecting a further operating fluid into a mixing chamber of the starting burner is arranged upstream of the catalyst inlet, the mixing chamber being arranged and configured for mixing the operating fluid with the further operating fluid.

10. The starting burner according to claim 9, wherein the mixing chamber has a deflection section for deflecting a flow direction of the operating fluid from the guide direction in the passage direction.

11. The starting burner according to claim 1, wherein in that upstream of the catalyst inlet, there is arranged a heating means for heating an operating fluid mixture from the operating fluid and the further operating fluid.

12. The starting burner according to claim 11, wherein the heating means is plate-shaped or substantially plate-shaped.

13. The starting burner according to claim 1, wherein only an upper side of the plate-shaped heating medium (can be directly heated.

14. The starting burner according to claim 11, wherein the heating means has an activation unit by means of which a heating operation of the heating means can be activated and deactivated.

15. A fuel cell system having a starting burner for a fuel cell system, comprising
a catalyst having a catalyst inlet and a catalyst outlet, a catalyst area being formed between the catalyst inlet and the catalyst outlet, and the catalyst area being surrounded by a catalyst wall in a passage direction from the catalyst inlet to the catalyst outlet,
an operating fluid guide section for supplying an operating fluid to the catalyst inlet, wherein the operating fluid guide section is arranged outside the catalyst at least in sections along the catalyst wall,
a deflection section formed at the end section of the operating fluid guide section directing the operating fluid into a perforated separating section, through which the operating fluid can be transferred from the operating fluid guide section in the direction of the catalyst,
the perforated separating section being arranged in an operating fluid flow direction between an end section of the operating fluid guide section and the catalyst inlet and adjoining an end section of the catalyst wall,
wherein the perforated separating section is funnel-shaped and is configured with recesses regularly made in the form of holes or slots or of other types,
further comprising an afterburner and a reformer, wherein the afterburner is arranged and configured for heating the reformer and the starting burner is arranged and configured for heating the afterburner.

16. A method for heating an operating fluid in a fuel cell system having a starting burner for a fuel cell system, comprising
a catalyst having a catalyst inlet and a catalyst outlet, a catalyst area being formed between the catalyst inlet and the catalyst outlet, and the catalyst area being surrounded by a catalyst wall in a passage direction from the catalyst inlet to the catalyst outlet,
an operating fluid guide section for supplying an operating fluid to the catalyst inlet, wherein the operating fluid guide section is arranged outside the catalyst at least in sections along the catalyst wall,
a deflection section formed at the end section of the operating fluid guide section directing the operating fluid into a perforated separating section, through which the operating fluid can be transferred from the operating fluid guide section in the direction of the catalyst,
the perforated separating section being arranged in an operating fluid flow direction between an end section of the operating fluid guide section and the catalyst inlet and adjoining an end section of the catalyst wall,
wherein the perforated separating section is funnel-shaped and is configured with recesses regularly made in the form of holes or slots or of other types,
further comprising an afterburner and a reformer, wherein the afterburner is arranged and configured for heating the reformer and the starting burner is arranged and configured for heating the afterburner, wherein the operating fluid is transferred through the operating fluid guide area (20) outside the catalyst at least in sections along the catalyst wall in the direction of the catalyst inlet.

17. A method according to claim 15, wherein the operating fluid mixture is transferred from a mixing chamber to the heating means and from there to the catalyst.

18. A procedure according to claim 15, wherein the heating means is in communication connection with a temperature sensor for determining a temperature in the fuel cell system, a heating operation of the heating means being activated or deactivated as a function of a defined temperature which is determined by the temperature sensor in the fuel cell system or in the afterburner.

\* \* \* \* \*